(12) United States Patent
Hirata

(10) Patent No.: US 12,741,630 B2
(45) Date of Patent: Sep. 22, 2026

(54) METHOD AND DEVICE FOR REGENERATIVE CONTROL OF HYBRID VEHICLE

(71) Applicant: Nissan Motor Co., Ltd., Yokohama (JP)

(72) Inventor: Takeshi Hirata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 135 days.

(21) Appl. No.: 18/578,752

(22) PCT Filed: Jul. 26, 2021

(86) PCT No.: PCT/JP2021/027468
§ 371 (c)(1),
(2) Date: Jan. 12, 2024

(87) PCT Pub. No.: WO2023/007529
PCT Pub. Date: Feb. 2, 2023

(65) Prior Publication Data

US 2024/0317209 A1 Sep. 26, 2024

(51) Int. Cl.
*B60W 20/14* (2016.01)
*B60W 30/18* (2012.01)

(52) U.S. Cl.
CPC ...... *B60W 20/14* (2016.01); *B60W 30/18127* (2013.01); *B60W 2510/244* (2013.01);
(Continued)

(58) Field of Classification Search
CPC ........... B60W 20/14; B60W 30/18127; B60W 2510/244; B60W 2540/16;
(Continued)

(56) References Cited

U.S. PATENT DOCUMENTS 5,778,326 A * 7/1998 Moroto .................. B60L 58/10 903/903
9,381,906 B2 7/2016 Isomura et al.
10,611,361 B2 * 4/2020 Park ...................... B60W 10/06
11,614,335 B2 * 3/2023 Wray ................ G01C 21/3685 701/22

(Continued)

FOREIGN PATENT DOCUMENTS

JP 2000-333305 A 11/2000
JP 2008279803 A * 11/2008
JP 2009-274610 A 11/2009
WO 2013/136483 A1 9/2013

OTHER PUBLICATIONS

JP 2008279803 A Translation (Year: 2008).*

*Primary Examiner* — Christopher George Fees
(74) *Attorney, Agent, or Firm* — Spencer Fane LLP

(57) ABSTRACT

A hybrid vehicle us equipped with a power generation first motor generator driven by an internal combustion engine, and a second motor generator driven by a battery. The hybrid vehicle includes an S mode, an ECO mode and a NORMAL mode which are basic travel modes. A mode change switch is used to switch between the modes. In the S mode and the ECO mode, a deceleration rate of regenerative braking on downhill roads is large, and an amount of regeneration is large. When a downhill road on a travel route has been predicted, in the S mode and the ECO mode, a controller executes an SOC reduction control in which an SOC is reduced in advance before a downhill road starts, and in the NORMAL mode, the controller does not execute the SOC reduction control.

7 Claims, 3 Drawing Sheets

(52) U.S. Cl.
CPC ..... *B60W 2540/16* (2013.01); *B60W 2540/30* (2013.01); *B60W 2556/10* (2020.02)

(58) Field of Classification Search
CPC ......... B60W 2540/30; B60W 2556/10; B60W 2050/0031; B60W 2552/15; B60W 2552/20; B60W 2552/25; B60W 2556/50; B60W 2710/083; B60W 2710/244; B60W 2720/106; B60W 10/06; B60W 10/08; B60W 10/26; B60W 20/11; B60W 20/12; B60W 30/182; B60W 40/076; B60W 40/107; B60W 40/13; B60W 50/0097; B60W 50/082; B60K 6/46; Y02T 10/62; Y02T 10/70
See application file for complete search history.

(56) References Cited

U.S. PATENT DOCUMENTS

2014/0290421 A1 10/2014 Baumer et al.
2015/0377158 A1* 12/2015 Benjey .................. B60W 20/13 903/905
2016/0318501 A1* 11/2016 Oldridge ............... B60W 20/12
2016/0325726 A1* 11/2016 Liang .................... B60W 10/06
2017/0088117 A1* 3/2017 Ogawa .................... B60L 58/15
2017/0120892 A1* 5/2017 Kato ......................... B60L 7/18
2017/0144650 A1* 5/2017 Nagamiya ............. B60W 20/14
2019/0241174 A1* 8/2019 Ito ........................... B60L 50/16
2022/0009355 A1* 1/2022 Kim ........................ B60L 53/66
2022/0219671 A1* 7/2022 Ogawa .................. B60W 10/26
2024/0275181 A1* 8/2024 Zhang ................. H01M 10/425

* cited by examiner

METHOD AND DEVICE FOR REGENERATIVE CONTROL OF HYBRID VEHICLE

CROSS-REFERENCE TO RELATED APPLICATIONS

This application is a U.S. national stage application of International Application No. PCT/JP2021/027468, filed on Jul. 26, 2021.

BACKGROUND

Technical Field

The present invention relates to a regenerative control technology for a hybrid vehicle, in which power regeneration is performed efficiently on downhill roads.

Background Information

In a hybrid vehicle in which a drive wheel is driven by a motor generator, power is regenerated and a battery is charged when the vehicle travels on downhill roads. A state of charge (SOC) that is to be a usage upper limit for a battery is established in order to avoid deterioration due to overcharging, and when the SOC reaches the usage upper limit during regeneration, no further charging occurs and the regenerated power is consumed in a particular configuration.

Patent Citation 1 discloses a technology in which when there is a downhill road on a planned route, travel by motor or another scheme is performed to actively reduce the SOC before approaching the downhill road in order to maximize the energy recovery from downhill road travel. Due to the SOC being reduced in advance, there is more allowance before the usage upper limit, and efficient energy recovery on downhill roads can be achieved.

However, Patent Citation 1 (Japanese Laid-open Patent Application No. 2000-333305) does not take into account differences in travel modes that result in differences in magnitude of the amount of regeneration on downhill roads, and advance SOC reduction is uniformly performed; therefore, there may be cases such as where the SOC at the end of a downhill road is relatively low when, for example, the actual amount of regeneration on the downhill road is small.

SUMMARY

The regeneration control of a hybrid vehicle according to the present invention detects in advance a downhill road on the vehicle's travel route, and performs SOC reduction control to lower the SOC of the battery in advance in preparation for regeneration on the downhill road before starting the downhill road, wherein switching between whether or not to execute the SOC reduction control depends on a travel mode selected by a driver among a plurality of travel modes that affect an amount of regeneration on the downhill road.

By taking the travel mode into account in this manner, it is possible to avoid advance SOC reduction control that would be unnecessary under certain travel modes.

BRIEF DESCRIPTION OF THE DRAWINGS

Referring now to the attached drawings which form a part of this original disclosure.

DETAILED DESCRIPTION OF EMBODIMENTS

Figure 1:
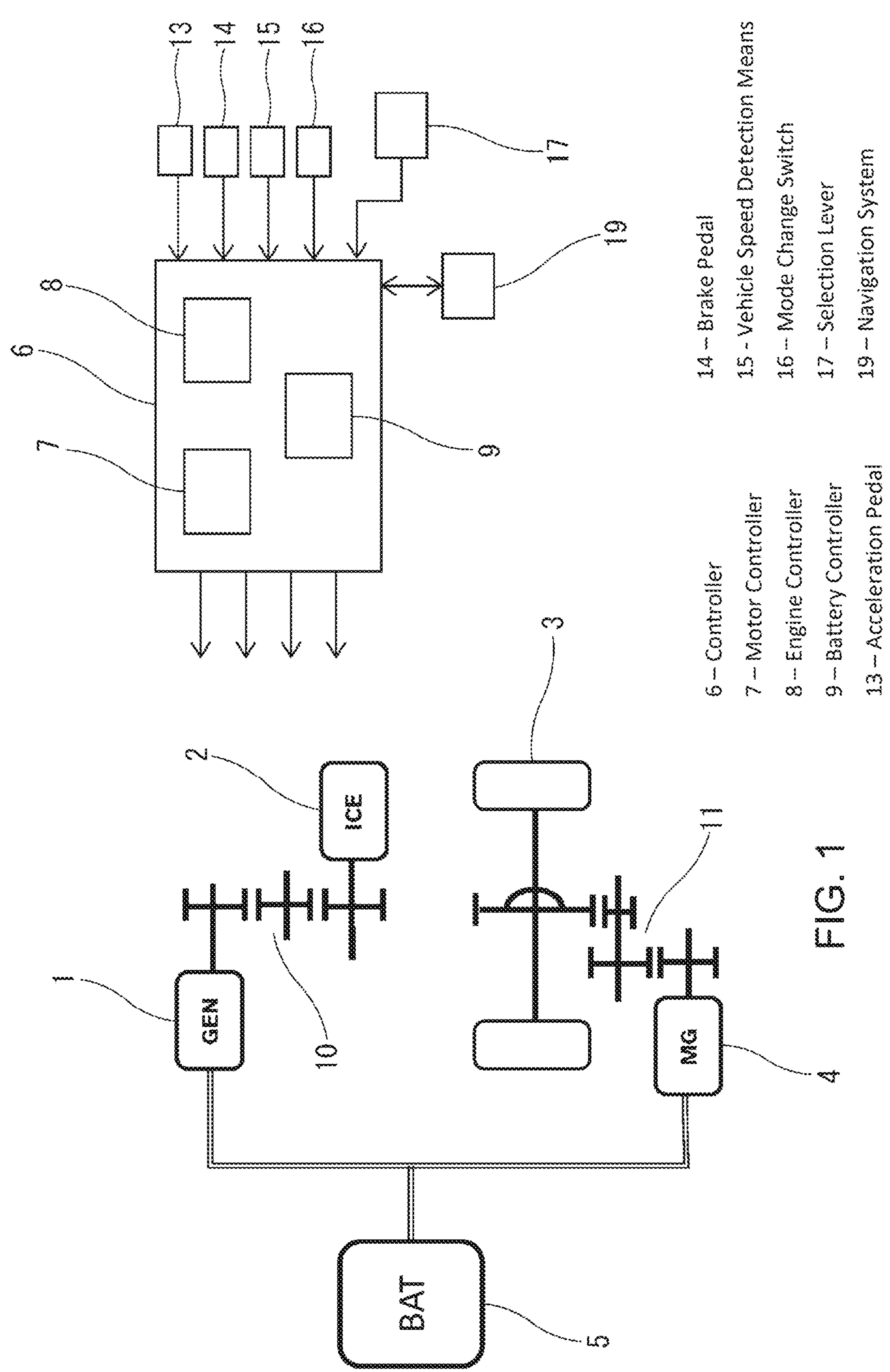
FIG. 1 is a diagram for describing a configuration of a hybrid vehicle of one embodiment.

FIG. 1 schematically depicts a configuration of a series hybrid vehicle as an example of a hybrid vehicle to which this invention is applied. The series hybrid vehicle comprises a power generation motor generator 1 that mainly operates as an electric generator, an internal combustion engine 2 used as a power generation internal combustion engine that drives the power generation motor generator 1 in accordance with a power request, a travel motor generator 4 that mainly operates as a motor and drives drive wheels 3, and a battery 5 that temporarily stores the generated power. In one embodiment, the power generation motor generator 1 is driven by the internal combustion engine 2 via a gear train 10. The drive wheels 3 are driven by the travel motor generator 4 via a gear train 11. The power obtained due to the internal combustion engine 2 driving the power generation motor generator 1 is stored in the battery 5 via an inverter device (not shown). The travel motor generator 4 is drivably controlled using the power of the battery 5. Regeneration power from the travel motor generator 4 is also stored in the battery 5 via an inverter device (not shown).

The operation of the motor generators 1 and 4, charging and discharging of the battery 5, and operation of the internal combustion engine 2 are controlled by a controller 6. The controller 6 is constituted of a plurality of controllers connected to as to be communicable with each other, such as a motor controller 7 that controls the motor generators 1 and 4, an engine controller 8 that controls the internal combustion engine 2, and a battery controller 9 that manages the battery 5. The controller 6 receives input of information such as a position (depressed amount) of an acceleration pedal 13, an operation amount of a brake pedal 14, and vehicle speed detected by a vehicle speed detection means 15. The battery controller 9 determines an SOC of the battery 5 on the basis of a voltage and a current of the battery 5. Basically, the engine controller 8 is requested to start the internal combustion engine 2 on the basis of a decrease in the SOC. A state in which the series hybrid vehicle travels via the electric power of the battery 5 without combustion operation of the internal combustion engine 2 is referred to as EV mode, and a state in which the vehicle travels while electricity is generated through combustion operation of the internal combustion engine 2 is referred to as HEV mode, but these modes EV and HEV are different concepts from the "travel mode" in the claims.

The series hybrid vehicle of one embodiment has three basic travel modes regarding the behavior or operability of the vehicle: "S mode," "ECO mode," and "NORMAL mode." These modes can be changed by using a mode change switch 16. S mode is a mode in which vehicle responsiveness to operation of the acceleration pedal 13 can be increased. In S mode, a comparatively high torque rise is applied when the acceleration pedal 13 is depressed, and strong regenerative braking is applied when the acceleration pedal 13 is off (when the pedal is released). ECO mode is a mode that emphasizes fuel efficiency compared to S mode. In ECO mode, the torque rise when the acceleration pedal 13 is depressed is relatively gradual, and the regenerative braking when the acceleration pedal 13 is off is relatively gradual. In S mode and ECO mode, vehicle acceleration and deceleration operations are possible using only the acceleration pedal 13. In addition, when the brake pedal 14 is depressed, "cooperative regenerative braking control" is executed in which some of the necessary braking force is provided by regenerative braking, and the deficiency is provided by friction brake mechanisms of the wheels.

NORMAL mode is a mode in which a driving sensation similar to that of a non-hybrid gasoline engine vehicle can be achieved. While a moderate sense of acceleration is provided in NORMAL mode, active regenerative braking is not performed when the acceleration pedal 13 is off (for example, weak regenerative braking equivalent to "engine braking" is performed). In addition, when the brake pedal 14 is depressed, cooperative regenerative braking control is not performed, and braking is performed by the friction brake mechanisms. These three modes can be selected according to weather conditions for the driver, and are normally switched before the vehicle starts traveling.

Of the three modes described above, S mode and ECO mode are equivalent to the "condition where the deceleration rate of regenerative braking that occurs on a downhill road is large" in the claims. Furthermore, S mode and ECO mode are equivalent to "regenerative braking mode," and NORMAL mode is equivalent to "normal braking mode."

The series hybrid vehicle of one embodiment is not equipped with a transmission mechanism, but is similar to a vehicle provided with an automatic transmission, and is provided with a selection lever 17 for selecting one of a plurality of shift positions by lever operation. Examples of shift positions include "D," which is for forward, "R," which is for reverse, "P," which is selected while the vehicle is stopped or when the vehicle is started, "N," which is for a power cutoff state, and "B," which is for temporarily performing strong regenerative braking on a downhill road or the like. Switching between the D and B positions is possible during travel. When the driver selects the B position on, for example, a downhill road or the like, strong regenerative braking is applied when the acceleration pedal 13 is off even if the basic travel mode at the time is NORMAL mode. When the basic travel mode is S mode or ECO mode and the B position is selected via the selection lever 17, regenerative braking is applied that is relatively stronger than in the case of the D position. Therefore, the B position is equivalent to the "condition where the deceleration rate of regenerative braking that occurs on a downhill road is large" in the claims.

The vehicle of one embodiment is provided with a navigation system 19 that uses a GPS system and map information of relatively high accuracy. The map information of the navigation system 19 includes three-dimensional information regarding roads, i.e., gradient information on roads. The map information may be stored in a storage device, such as a hard disk, of the navigation system 19, and may be sent to the navigation system 19 from outside the vehicle during travel via, for example, 5G communication or the like. This navigation system 19 makes it possible to detect downhill roads on the travel route of the vehicle in advance, and also to acquire information such as the gradients of the downhill roads and the lengths of the downhill roads. Even if a destination is not registered in the navigation system 19, it is possible to detect or predict a downhill road ahead of the current travel route.

There follows a description of regeneration control used on downhill roads by the series hybrid vehicle configured as described above. On a downhill road, regeneration is performed due to the travel motor generator 4 being driven by the drive wheels 3. It is undesirable for the SOC of battery 5 to exceed an allowable usage limit during regeneration; therefore, in order to maximize energy recovery through downhill road travel, when there is a downhill road on the planned route, SOC reduction control is executed, in which, inter alia, travel under EV mode is performed to actively reduce the SOC before the vehicle approaches the downhill road.

In the present embodiment, whether or not SOC reduction control is executed depends on the travel mode selected by the driver among a plurality of travel modes that affect the amount of regeneration on downhill roads. That is, SOC reduction control is executed in advance if the travel mode is one in which a large amount of regeneration on a downhill road can be expected, and SOC reduction control is not executed if the travel mode is one in which the amount of regeneration on a downhill road will not be very large.

Figure 2:
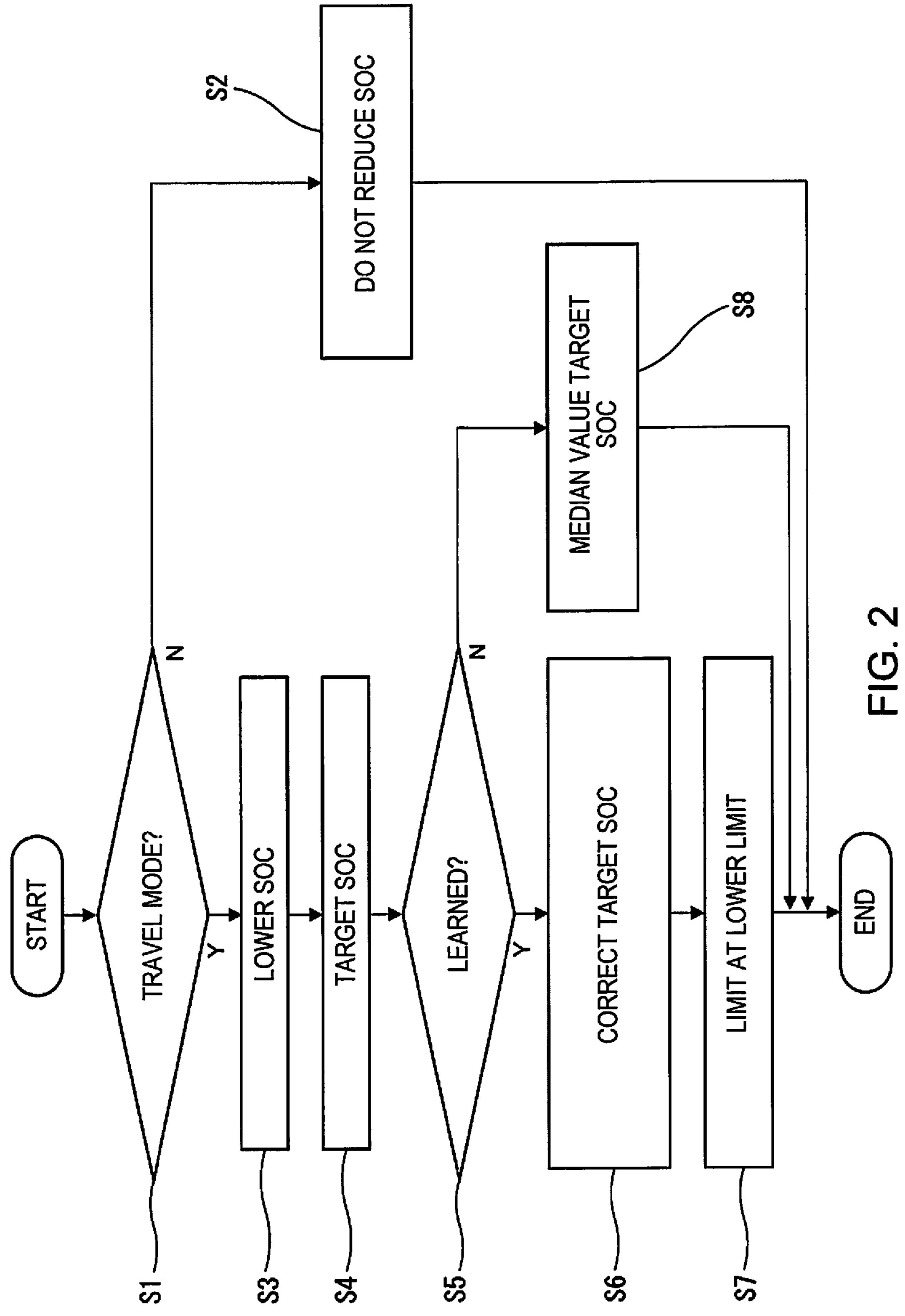
FIG. 2 is a flowchart of the flow of a process of regeneration control relating to downhill road travel.

FIG. 2 is a flowchart of a flow of a process executed by the controller 6 when a downhill road is predicted. A routine is initiated when a downhill road is predicted, and in the first step 1, a determination is made as to whether or not the travel mode is one in which SOC reduction control should be executed in advance for the predicted downhill road. In one embodiment, the travel mode is assessed to be one in which SOC reduction control should be executed in advance in cases in which the basic travel mode is S mode and ECO mode, and in cases in which the basic travel mode is NORMAL mode but the shift position is the B position. In NORMAL mode with the D position, the amount of regeneration on a downhill road is small, and the determination in step 1 is therefore NO. In this case, the routine advances from step 1 to step 2 and no prior SOC reduction control is performed. That is, travel is continued in accordance with the normal target SOC.

If the determination in step 1 is YES, the routine advances to step 3, and a flag is set to indicate that SOC reduction control will be executed. SOC reduction control may be initiated after waiting for an appropriate timing, or SOC reduction control may be initiated immediately.

Next, the routine advances to step 4 and a target SOC for a location immediately before the downhill road is computed. That is, a target value indicating how much the SOC is to be reduced by SOC reduction control is determined. This is basically determined according to the travel mode in which the amount of regeneration differs in magnitude under the same downhill road conditions, and the predicted downhill road conditions. In other words, the target SOC is determined in accordance with the amount of regeneration expected to be supplied to the battery 5 due to downhill road travel.

For example, in S mode with the B position, the amount of regeneration for the same downhill road is the largest in order to forcefully cause regenerative braking, and in ECO mode with the D position, the amount of regeneration for the same downhill road is relatively small because regenerative braking will be relatively weak; therefore, the target SOC is different in these scenarios. In addition, the gradient of the downhill road and the length of the downhill road are inputted as the downhill road conditions. An altitude difference between the starting point and the ending point of the downhill road may be used as a downhill road condition. In addition, the amount of regeneration accompanying regenerative braking will be commensurately greater with heavier vehicles; therefore, the weight of the vehicle including occupants may be detected or estimated through an appropriate means, and the weight may be taken into account to estimate the amount of regeneration expected due to downhill road travel. The target SOC determined in step 4 is a basic target SOC that does not take into account a driving tendency of the driver.

The amount of regeneration expected during downhill road travel is actually arrived at by subtracting the power consumed during downhill road travel. Therefore, the amount of power consumed by a cabin air conditioner, vehicle lights, wipers, audio devices, the navigation system 19, etc., at the current time point may also be taken into account to determine the basic target SOC.

Next, in steps 5 to 7, the basic target SOC is corrected to a more appropriate value according to the driving tendency of the driver. The driving tendency of the driver can be learned from data on past amounts of regeneration on downhill roads, and data such as past driving operation amounts and vehicle acceleration rates on downhill roads. First, in step 5, an assessment is made as to whether or not the driving tendency of the driver has been determined (i.e., learned). In one embodiment, driving tendencies of drivers can be roughly divided into two types: a tendency to drive comparatively calmly, and a tendency to drive comparatively aggressively. These tendencies, as well as the extents thereof, are learned. For example, on the basis of past driving data, it is determined that a driver has a tendency to frequently depress the acceleration pedal 13 or the brake pedal 14, or a tendency to drive aggressively, such as in cases where these actions are sudden, cases where the vehicle frequently accelerates and decelerates, and cases where the vehicle often accelerates and decelerates suddenly. Conversely, when infrequent, such actions may be determined to be calm. Another possible example of a driving tendency related to the amount of regeneration on a downhill road is the tendency of whether or not the driver often switches from the D position to the B position partway along a downhill road. Furthermore, past data on the amount of regeneration on a downhill road can be used to determine whether a driving tendency actually results in a large amount of regeneration or a small amount of regeneration. If such a driving tendency has already been determined and stored, the determination in step 5 is YES, otherwise the determination is NO. If the determination is NO, i.e., if the driving tendency is unclear, the routine advances from step 5 to step 8, and the value determined as the final target SOC is a value corresponding to a median value of driving tendencies from among a large amount of data that correlates different extents of driving tendencies and appropriate target SOCs (in other words, target SOCs resulting from the basic target SOC being corrected according to driving tendencies). Alternatively, the basic target SOC determined in step 4 may be used without being corrected.

Once the driving tendency has been learned, the routine advances to step 6, the driving tendency is taken into account to correct the basic target SOC, and the final target SOC is thereby determined. If the driving tendency is to drive calmly, the final target SOC is set lower commensurately with respect to a higher degree of calm driving. In cases where the driving tendency is to drive calmly, generally, there will be fewer instances of re-acceleration due to unnecessary operation of the brake pedal 14 or depressing of the acceleration pedal 13 on a downhill road, and a greater amount of energy can be recovered in accordance with the difference in altitude on the downhill road. If the driver has a tendency to switch to the B position partway along the downhill road, it is preferable to lower the final target SOC. In cases where the driver has a tendency to drive aggressively, it is possible that less energy will be recovered due to, inter alia, the friction brake mechanisms being operated by brake action partway along the downhill road, or the vehicle being re-accelerated unnecessarily. Therefore, if the driving tendency is to drive aggressively, the target SOC at a position immediately before the downhill road is set higher. That is, the amount of reduction in SOC reduction control is smaller.

In the next step 7, the target SOC determined with the driving tendency taken into account is limited to a range that is higher than a predetermined lower limit threshold value. That is, the target SOC determined in step 6 is compared with the lower limit threshold value, and if the target SOC is less than the lower limit threshold value, the lower limit threshold value is used as the target SOC. An excessive SOC reduction is thereby avoided.

In accordance with the target SOC that has been so determined, the SOC of the battery 5 is reduced by actions such as, for example, the traveling of the vehicle in EV mode and the appropriate driving of auxiliary equipment. The SOC of the battery 5 is thereby reduced nearly to the target SOC at a position immediately before the downhill road. Therefore, in the subsequent downhill road travel, maximum energy recovery can be achieved without exceeding the usage upper limit SOC of the battery 5.

Figure 3:
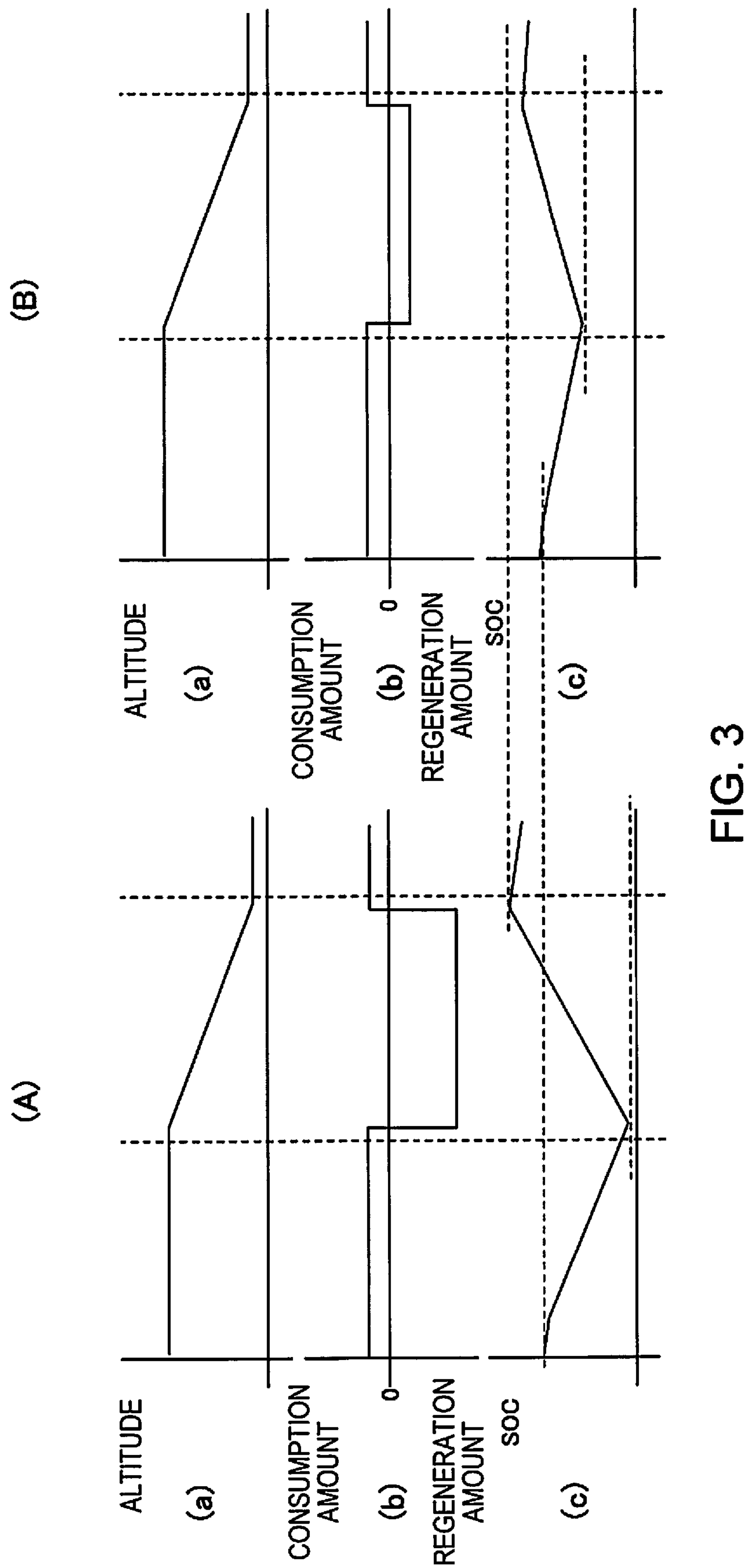
FIG. 3 is a time chart for describing operation in one embodiment.

FIG. 3 is a characteristic chart in which (a) the altitude change on a travel route, (b) the power consumption/amount of regeneration of the travel motor generator 4, and (c) the change in the SOC of the battery 5 are compared between (A) a case of a travel mode (e.g., the D position in S mode) in which the amount of regeneration on a downhill road is relatively large, and (B) a case of a travel mode (e.g., the D position in ECO mode) in which the amount of regeneration on a downhill road is relatively small.

The conditions of the downhill road, namely the gradient and length, are the same for both cases (A) and (B). In the case of (A), the amount of regeneration on the downhill road is comparatively large as shown in (b). Therefore, the target SOC immediately before the downhill road is set low as shown in (c). The SOC is thus sufficiently reduced, thereby making maximum energy recovery possible on the downhill road. In the case of (B), the amount of regeneration on the downhill road is comparatively small as shown in (b). Therefore, the target SOC immediately before the downhill road is set high as shown in (c). Thus, the SOC is not excessively reduced before the downhill road, and the SOC can thereby be kept to the proper levels before and after the downhill road.

Thus, in the above embodiment, whether or not SOC reduction control will be performed to reduce the SOC of the battery in advance in preparation for regeneration on a downhill road is determined depending on whether the travel mode is one in which the amount of regeneration on downhill roads is large or one in which the amount of regeneration on downhill roads is small, and even in cases in which SOC reduction control is performed, the target SOC immediately before the downhill road is set to a proper value according to the travel mode and the driving tendency of the driver. Therefore, efficient energy recovery is made possible while avoiding excessive increases or decreases in the SOC.

An embodiment of the invention was described above in detail, but the above embodiment is not provided by way of limitation on the invention, and various changes can be made. For example, the invention can be broadly applied not only to series hybrid vehicles but also to hybrid vehicles capable of regeneration on downhill roads, such as series/parallel hybrid vehicles and plug-in hybrid vehicles.

In the above embodiment, a specific example was described in which the travel modes were S mode, ECO mode, etc., but the travel modes of the present invention broadly include a plurality of travel modes that differ in the amount of regeneration on downhill roads, regardless of the specific names of the modes.

In the above embodiment, in S mode and ECO mode in which regenerative braking is performed when the acceleration pedal 13 is off, cooperative regenerative braking control is performed when the brake pedal 14 is depressed, but regenerative braking while the acceleration pedal 13 is off and cooperative regenerative braking control while the brake pedal 14 is depressed can be individually switched between on and off.

In the present invention, cooperative regenerative braking control during brake pedal operation is not necessarily required, and the invention can also be applied to vehicles that do not have a mechanism for cooperative regenerative braking control.

The invention claimed is:

1. A regenerative control method for a hybrid vehicle equipped with a motor generator connected to drive wheels of the hybrid vehicle, and a battery, the method comprising:

detecting in advance a downhill road on a travel route for the hybrid vehicle;

performing an SOC reduction control in advance to lower an SOC of the battery in preparation for regeneration on the downhill road before starting on the downhill road;

switching between executing and not executing the SOC reduction control in accordance with a travel mode selected by a driver among a plurality of travel modes that affect an amount of regeneration on the downhill road;

determining in advance whether a driving tendency is a calm driving tendency or an aggressive driving tendency when traveling the downhill road from data on past amounts of regeneration on downhill roads;

determining in advance an expected amount of regeneration and setting an SOC reduction amount to be higher when the expected amount of regeneration is greater, while traveling on the downhill road and the SOC reduction control is being executed; and setting a final target SOC according to the SOC reduction amount, the final target SOC being set lower for the calm driving tendency than for the aggressive driving tendency by correcting the SOC reduction amount responsive to the determined driving tendency, the driving tendency not reducing the SOC reduction amount below a predetermined threshold.

2. The regenerative control method according to claim 1, wherein the travel modes that affect the amount of regeneration on the downhill road include a regenerative braking mode in which regenerative braking is performed during braking, and a normal braking mode in which friction braking is mainly performed during braking, the SOC reduction control is executed in the regenerative braking mode, and the SOC reduction control is not performed in the normal braking mode.

3. The regenerative control method according to claim 1, wherein the travel modes that affect the amount of regeneration on the downhill road include a D position for normal travel selected using a selection lever, and at least one second shift position that increases a deceleration rate under regenerative braking compared to traveling in the D position, and the SOC reduction control is executed in the second shift position.

4. The regenerative control method according to claim 1, wherein when executing the SOC reduction control, the SOC reduction amount is set larger as deceleration of regenerative braking that occurs on a downhill road becomes larger, when executing the SOC reduction control, the SOC reduction amount is set larger so as to be greater in conditions involving a higher deceleration rate under regenerative braking that occurs on the downhill road.

5. The regenerative control method according to claim 1, wherein the driving tendency of the driver is learned from past driving operation amounts and vehicle acceleration rates on downhill roads.

6. The regenerative control method according to claim 1, wherein the driving tendency of the driver is learned from data on past amounts of regeneration on downhill roads.

7. A regenerative control device for a hybrid vehicle equipped with a motor generator connected to a drive wheel of the hybrid vehicle, and a battery, the regenerative control device comprising:

a navigation system configured to detect a downhill road on a travel route for the hybrid vehicle in advance, the navigation system including a processor and a storage;

a travel mode selection switch configured for a driver to select from among a plurality of travel modes, the plurality of travel modes including travel modes having different amounts of regeneration on downhill roads; and a control unit configured to selectively execute an SOC reduction control that reduces an SOC of the battery in advance in preparation for regeneration on the downhill road before starting on the downhill road in accordance with the travel mode selected by the driver, the control unit being configured to determine in advance whether a driving tendency is a calm driving tendency or an aggressive driving tendency when traveling the downhill road from data on past amounts of regeneration on downhill roads, determine in advance an expected amount of regeneration and setting an SOC reduction amount to be higher when the expected amount of regeneration is greater, while traveling on the downhill road and the SOC reduction control is being executed, and set a final target SOC according to the SOC reduction amount, the final target SOC being set lower for the calm driving tendency than for the aggressive driving tendency by correcting the SOC reduction amount responsive to the determined driving tendency, the driving tendency not reducing the SOC reduction amount below a predetermined threshold.

* * * * *